(12) United States Patent
Novlan et al.

(10) Patent No.: US 10,993,150 B2
(45) Date of Patent: Apr. 27, 2021

(54) WIRELESS CONTROL PLANE HAVING CENTRALIZED AND DISTRIBUTED CONTROL MESSAGES

(71) Applicant: AT&T Intellectual Property I, L.P., Atlanta, GA (US)

(72) Inventors: Thomas Novlan, Cedar Park, TX (US); Milap Majmundar, Austin, TX (US); Salam Akoum, Austin, TX (US); Xiaoyi Wang, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/419,577

(22) Filed: May 22, 2019

(65) Prior Publication Data
US 2020/0374763 A1 Nov. 26, 2020

(51) Int. Cl.
*H04W 36/00* (2009.01)
*H04W 36/08* (2009.01)
(Continued)

(52) U.S. Cl.
CPC ... *H04W 36/0033* (2013.01); *H04W 36/0055* (2013.01); *H04W 36/08* (2013.01);
(Continued)

(58) Field of Classification Search
CPC ............ H04W 36/0033; H04W 36/08; H04W 36/0055; H04W 36/32; H04W 40/36; H04W 88/04; H04W 88/085
(Continued)

(56) References Cited

U.S. PATENT DOCUMENTS

2016/0183121 A1* 6/2016 Kazmi ............... H04L 41/0803
370/230
2018/0262265 A1* 9/2018 Hyslop ............. H04B 7/18506
(Continued)

OTHER PUBLICATIONS

"3rd Generation Partnership Project; Technical Specification Group Services and System Aspects; Release 16 Description; Summary of Rel-16 Work Items (Release 16)" 3GPP, 3GPP TR 21.916 V05.0 (Jul. 2020), 73 pages.
(Continued)

*Primary Examiner* — Inder P Mehra
(74) *Attorney, Agent, or Firm* — Amin, Turocy & Watson, LLP

(57) ABSTRACT

According to an embodiment, a system can comprise a processor and a memory that can store executable instructions that, when executed by the processor, facilitate performance of operations. The operations can include communicating with a core network device of a core network by employing a first wireless connection to a first base station device communicatively coupled to the core network device. The operations can further include establishing a second wireless connection with a user equipment to enable the user equipment to communicate with the core network device. The operations can further include communicating a first control message and a second control message to the user equipment, wherein the first control message comprises first parameters associated with the first wireless connection and the second control message comprises second parameters associated with the second wireless connection.

20 Claims, 10 Drawing Sheets

(51) Int. Cl.
  *H04W 36/32* (2009.01)
  *H04W 40/36* (2009.01)
  *H04W 88/04* (2009.01)
  *H04W 88/08* (2009.01)
(52) U.S. Cl.
  CPC .......... *H04W 36/32* (2013.01); *H04W 40/36* (2013.01); *H04W 88/04* (2013.01); *H04W 88/085* (2013.01)
(58) Field of Classification Search
  USPC ........................................................ 455/440
  See application file for complete search history.

(56) References Cited

U.S. PATENT DOCUMENTS

| | | | |
|---|---|---|---|
| 2019/0261264 A1* | 8/2019 | Lou ........................ | H04W 48/18 |
| 2019/0373416 A1* | 12/2019 | Niesen ................... | H04W 4/025 |
| 2020/0107210 A1* | 4/2020 | Wu ......................... | H04W 8/24 |
| 2020/0358508 A1* | 11/2020 | Li .......................... | H04W 76/11 |

OTHER PUBLICATIONS

"3rd Generation Partnership Project; Technical Specification Group Radio Access Network; NR; Study on Integrated Access and Backhaul; (Release 16)" 3GPP, 3GPP TR 38.874 V16.0.0 (Dec. 2018), 111 pages.

"3rd Generation Partnership Project; Technical Specification Group Radio Access Network; NR; Radio Resource Control (RRC) protocol specification (Release 15)" 3GPP, 3GPP TS 38.331 V15.5.0 (Mar. 2019), 491 pages.

* cited by examiner

DONOR RRC MESSAGE 515

| | |
|---|---|
| Centralized Control Plane Functions | 510A |
| Bearer Configurations | 510B |
| PDCP Related Paramters | 510C |

1

ANCHOR RRC MESSAGE 525

| | |
|---|---|
| RRM Parameters/Measurements | 520A |
| RACH Channel Configuration | 520B |
| Serving Cell-Specific Parameters | 520C |
| Data/Control Channel Parameters | 520D |

WIRELESS CONTROL PLANE HAVING CENTRALIZED AND DISTRIBUTED CONTROL MESSAGES

TECHNICAL FIELD

The subject application is related to wireless communication systems, and, for example, employing a distributed control plane for relay base stations and user equipments (UEs) in a wireless network.

BACKGROUND

Modern communications can use chains of interconnected base stations to connect with a user device. Traditionally, user devices can receive control messages when base station conditions change, e.g., based on interference or signal quality. Further, when user devices have to transition from one base station to another, resource intensive handover procedures can degrade performance.

Based on the rapid development of distributed communications links, unnecessary handovers can be triggered at user equipment, and as a result, benefits of the new approaches may not be fully realized.

BRIEF DESCRIPTION OF THE DRAWINGS

The technology described herein is illustrated by way of example and not limited in the accompanying figures in which like reference numerals indicate similar elements and in which:

FIG. 5 depicts an example of the parameters included in an example donor RRC message, and an anchor RRC message, in accordance with one or more embodiments.

DETAILED DESCRIPTION

Figure 1:
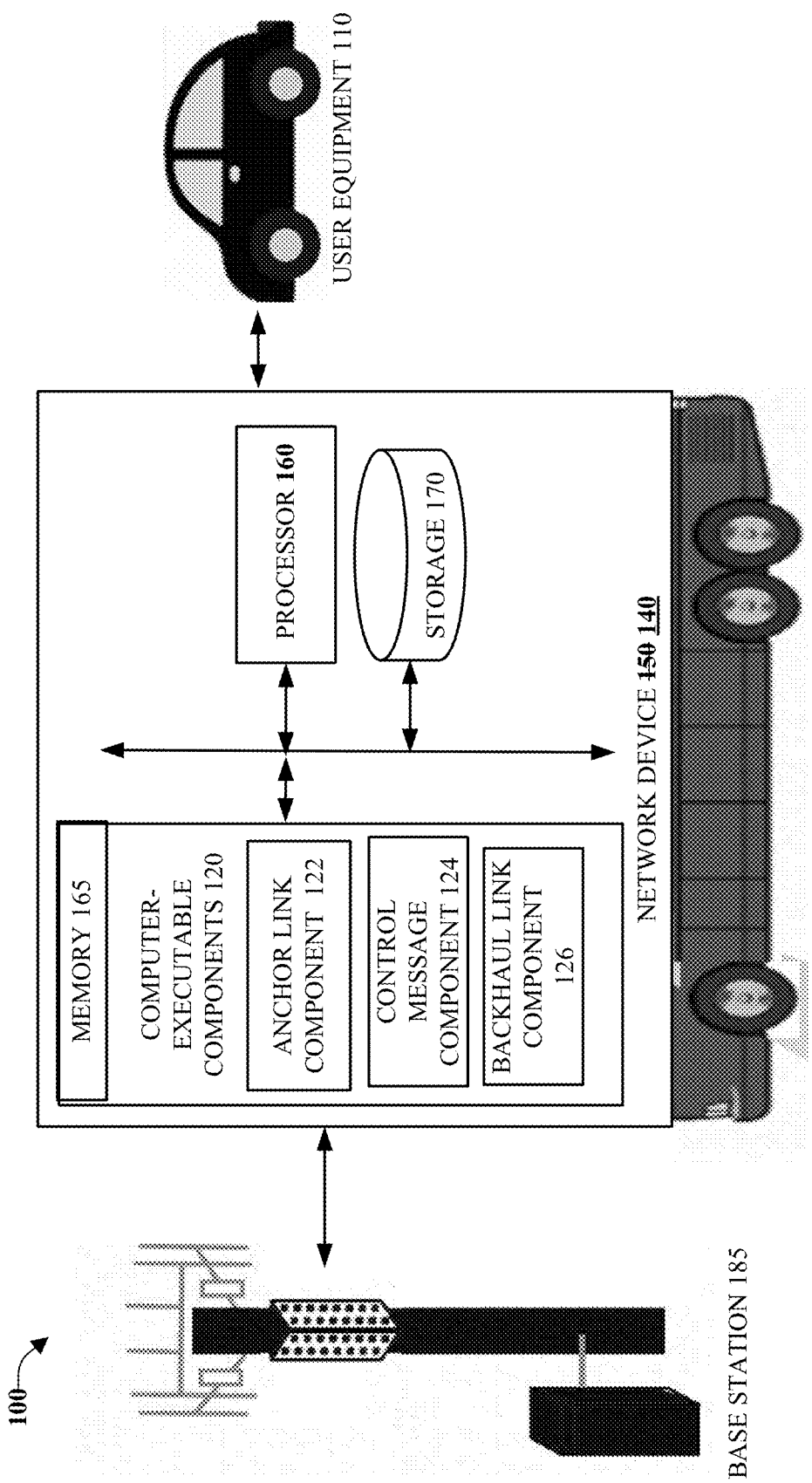
FIG. 1 illustrates a block diagram of an example, non-limiting system that includes network device communicatively coupled to base station and user equipment by wireless connections, in accordance with one or more embodiments.

Generally speaking, one or more embodiments described herein provide mechanisms and signaling to facilitate a wireless control plane having centralized and distributed control messages, in accordance with one or more embodiments.

In addition, one or more embodiments described herein can be directed towards a multi-connectivity framework that supports the operation of New Radio (NR, also termed 5G). As will be understood, one or more embodiments can allow an integration of V2X UEs with network assistance, by supporting control and mobility functionality on cellular links (e.g. Long Term Evolution (LTE) or NR). One or more embodiments can provide benefits including, system robustness, reduced overhead, and global resource management, while facilitating direct communication links via a NR sidelink.

It should be understood that any of the examples and terms used herein are non-limiting. For instance, while examples are generally directed to non-standalone operation where the NR backhaul links are operating on mmWave bands and the control plane links are operating on sub-6 GHz LTE bands, it should be understood that it is straightforward to extend the technology described herein to scenarios in which the sub-6 GHz anchor carrier providing control plane functionality could also be based on NR. As such, any of the examples herein are non-limiting examples, any of the embodiments, aspects, concepts, structures, functionalities or examples described herein are non-limiting, and the technology may be used in various ways that provide benefits and advantages in radio communications in general.

In some embodiments the non-limiting term "radio network node" or simply "network node," "radio network device or simply "network device" is used herein. These terms may be used interchangeably, and refer to any type of network node that serves user equipment and/or connected to other network node or network element or any radio node from where user equipment receives signal. Examples of radio network nodes are Node B, base station (BS), multi-standard radio (MSR) node such as MSR BS, gNodeB, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS), etc.

In some embodiments, the non-limiting term integrated access backhaul (IAB) is used. In Release 16 of the 3rd Generation Partnership Project (3GPP) specification, an IAB framework based on fixed relays is standardized. This Release 16 IAB framework allows for a multi-hop network based on a hierarchical tree architecture. As described further below, in some embodiments, one or more of the non-limiting terms "relay node," "mobile relay node," "anchor node," and "mobile base station" can describe mobile relay nodes supporting a mobile IAB network. It should be appreciated that notwithstanding some descriptions herein referring to concepts of wireless base stations being "fixed," "stationary" or similar terms, and "mobile," "mobile," "nonfixed" or similar terms, these terms describing a capacity for movement are not limiting, e.g., in different embodiments, a mobile base station described herein can be fixed in position, and vice versa.

In some embodiments the non-limiting term user equipment (UE) is used. It can refer to any type of wireless device that communicates with a radio network node in a cellular or mobile communication system. Examples of user equipment are target device, device to device (D2D) user equipment, machine type user equipment or user equipment capable of machine to machine (M2M) communication, PDA, Tablet, mobile terminals, smart phone, laptop embedded equipped (LEE), laptop mounted equipment (LME), USB dongles, etc.

Some embodiments are described in particular for 5G new radio systems. The embodiments are however applicable to any radio access technology (RAT) or multi-RAT system where the user equipment operates using multiple carriers e.g. LTE FDD/TDD, WCMDA/HSPA, GSM/GERAN, Wi Fi, WLAN, WiMax, CDMA2000 etc.

Figure 2:
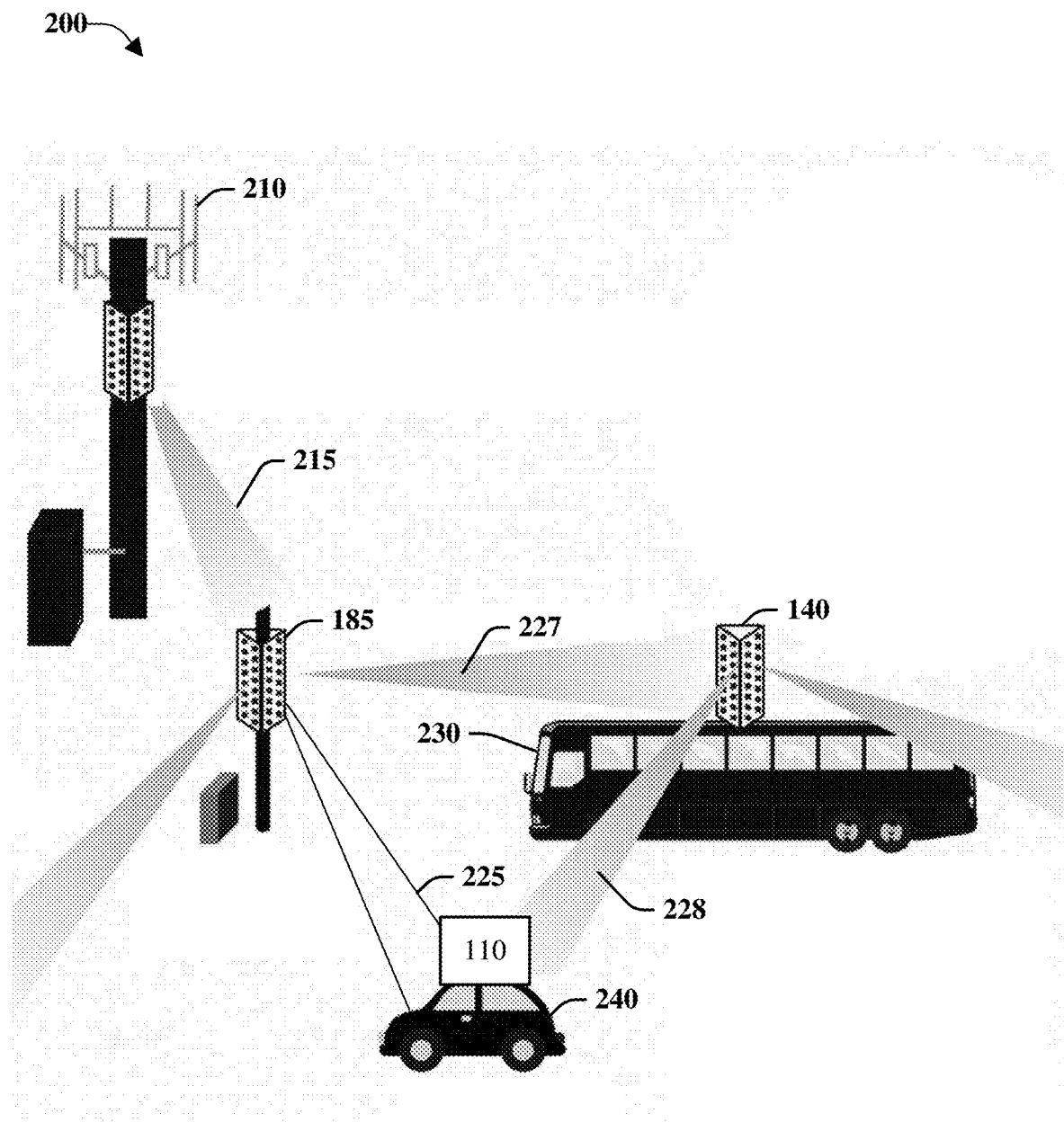
FIG. 2 illustrates an example wireless communication system showing example devices and connections that can facilitate a wireless control plane having centralized and distributed control messages, in accordance with one or more embodiments.

Broadly speaking, one or more embodiments can improve the operation of multi-hop networks by employing a wireless control plane having centralized and distributed control messages, e.g., an architecture where the control plane architecture (e.g., fixed base station to mobile base station) and the user plane architecture of the relay node (e.g., mobile base station to user equipment) are separated. One benefit that can result in some circumstances from separating the control and user plane is that mobility and handover of a given node does not necessarily trigger handover of a child node because a control-plane of a node (primary) connection is directly to the donor. This is especially true when the control plane is connected via sub-6 GHz (FR1) frequencies that allow longer range connectivity compared to mmWave (FR2) frequencies, as also indicated in FIG. 2. The use of FR1 for the control plane connection makes it possible to significantly reduce the need for handover of the child node.

FIG. 1 illustrates a block diagram of an example, non-limiting system 100 that includes network device 140 communicatively coupled to base station 185 and user equipment 110 by wireless connections, in accordance with one or more embodiments.

According to multiple embodiments, network device 140 includes memory 165 that can store one or more computer and/or machine readable, writable, and/or executable components and/or instructions that, when executed by processor 160, can facilitate performance of operations defined by the executable component(s) and/or instruction(s). For example, memory 165 can store computer executable components 120 that can, when executed by processor 160, can facilitate execution of anchor link component 122, control message component 124, and backhaul link component 126, as well as various other functions described herein relating to network device 140.

In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1006 and FIG. 10. Such examples of memory 165 can be employed to implement any embodiments of the subject disclosure.

According to multiple embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more central processing unit, multi-core processor, microprocessor, dual microprocessors, microcontroller, System on a Chip (SOC), array processor, vector processor, and/or another type of processor. Further examples of processor 160 are described below with reference to processing unit 1004 of FIG. 10. Such examples of processor 160 can be employed to implement any embodiments of the subject disclosure.

It should be appreciated that the embodiments of the subject disclosure depicted in various figures disclosed herein are for illustration only, and as such, the architecture of such embodiments are not limited to the systems, devices, and/or components depicted therein. For example, in some embodiments, network device 140 can further comprise various computer and/or computing-based elements described herein with reference to operating environment 1000 and FIG. 10. In one or more embodiments, such computer and/or computing-based elements can be used in connection with implementing one or more of the systems, devices, components, and/or computer-implemented operations shown and described in connection with FIG. 1 or other figures disclosed herein.

It should be noted that, in FIGS. 1-3 and 6, UEs 110 and network device 140 are represented by vehicle icons, some network devices are represented by base station icons, and some network devices 140 are represented by mobile base station icons (e.g., a bus), but these icons are not intended to be limiting of the types of UEs and network devices that can be used with the embodiments discussed herein. Detailed examples of different types of UEs and network devices that can be used with embodiments are described with FIG. 9 below, and detailed examples of different types of computer-enabled devices that can be used with embodiments are described with FIG. 10 below.

In one or more embodiments, backhaul link component 126 can communicate with core network 195 by employing first wireless connection between network device 140 and base station 185 communicatively coupled to the core network 195. In one or more embodiments, this link between two devices acting as base stations can be part of an IAB connection, with base station 185 being termed a donor node, and network device 140 being termed an anchor node. In this approach, the donor node can provide a backhaul link to core network 195 to the anchor node. In one or more embodiments, network device 140, operating as an anchor node, can employ anchor link component 122 to communicate with UE 110 to enable UE 110 to communicate with core network 195 by employing a second wireless connection.

In one or more embodiments, to establish a centralized command plane between central network elements (e.g., core network 195 and base station 185) and user equipment 110, a first message can be delivered to UE 110, e.g., by control message component 124. This first message, also termed a Donor RRC message or centralized control message, can contain configuration information about the backhaul connection between network device 140 and base station 185 and the core network. Examples of the information contained in this first message, and times when it is delivered to UE 110 are discussed below with FIGS. 3, 5, and 6. It should be noted that the labels first and second applied to any term discussed herein (messages, transformations, base stations, etc.) are non-limiting and only used for convenience. These elements can be utilized by embodiments in any order.

In one or more embodiments, to establish a connection between network device 140 and UE 110, a second message can be delivered to UE 110, e.g., by control message component 124. This second message, also termed an anchor RRC message or a distributed control message, can establish a distributed control plane between network device 140 and UE 110. This second message can contain information used by UE 110 to establish and maintain the connection between UE 110 and network device 140. Examples of the information contained in this first message, and times when it is delivered to UE 110 are discussed below with FIGS. 3, 5, and 6.

It should be noted that the approaches of one or more embodiments discussed above can reduce signalling overhead and latency, because existing RRC messages can be split into Donor RRC and Anchor RRC messages, with either or both of these sent when group mobility procedures impact either the centralized or distributed functionality, and associated parameters.

FIG. 2 illustrates an example wireless communication system 200 showing example devices and connections that can facilitate a wireless control plane having centralized and distributed control messages, in accordance with one or more embodiments. For purposes of brevity, description of like elements and/or processes employed in other embodiments is omitted.

Some embodiments depicted in FIG. 2 include variations of the elements and connections discussed with FIG. 1 above, with network device 140, located on vehicle 230 with wireless connection 228 to UE 110, located in vehicle 240. In addition, network device 140 has a wireless connection 227 to base station 185. Additional aspects that were not included with the discussion of FIG. 1 include wireless connection 225 directly between base station 185 and UE 110, and additional base station 210 having wireless connection 215 to base station 185.

Figure 3:
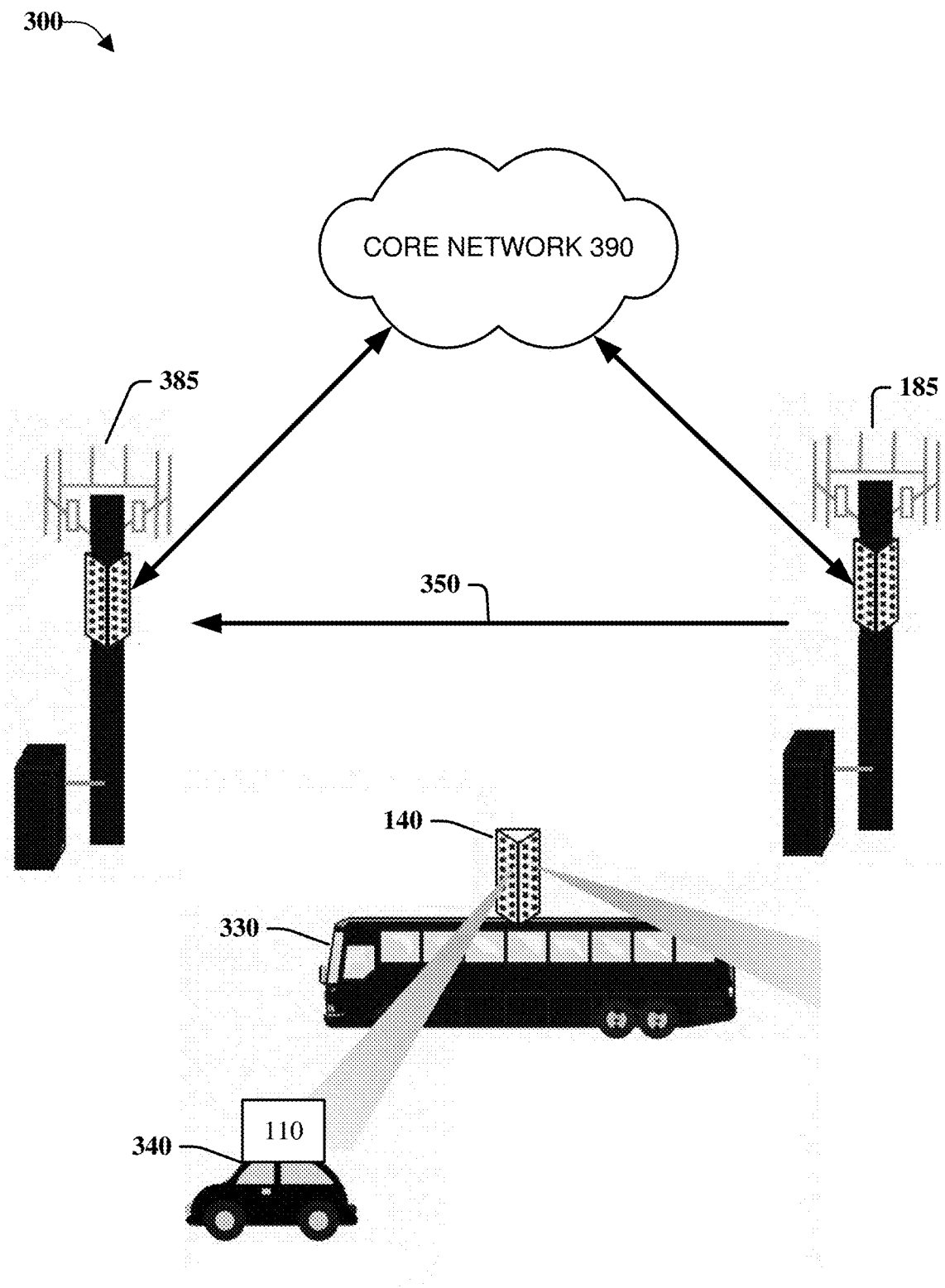
FIG. 3 illustrates an example wireless communication system and an event where a network device switches from a base station to as another base station, while a UE maintains a connection with a network device, in accordance with one or more embodiments.
Figure 6:
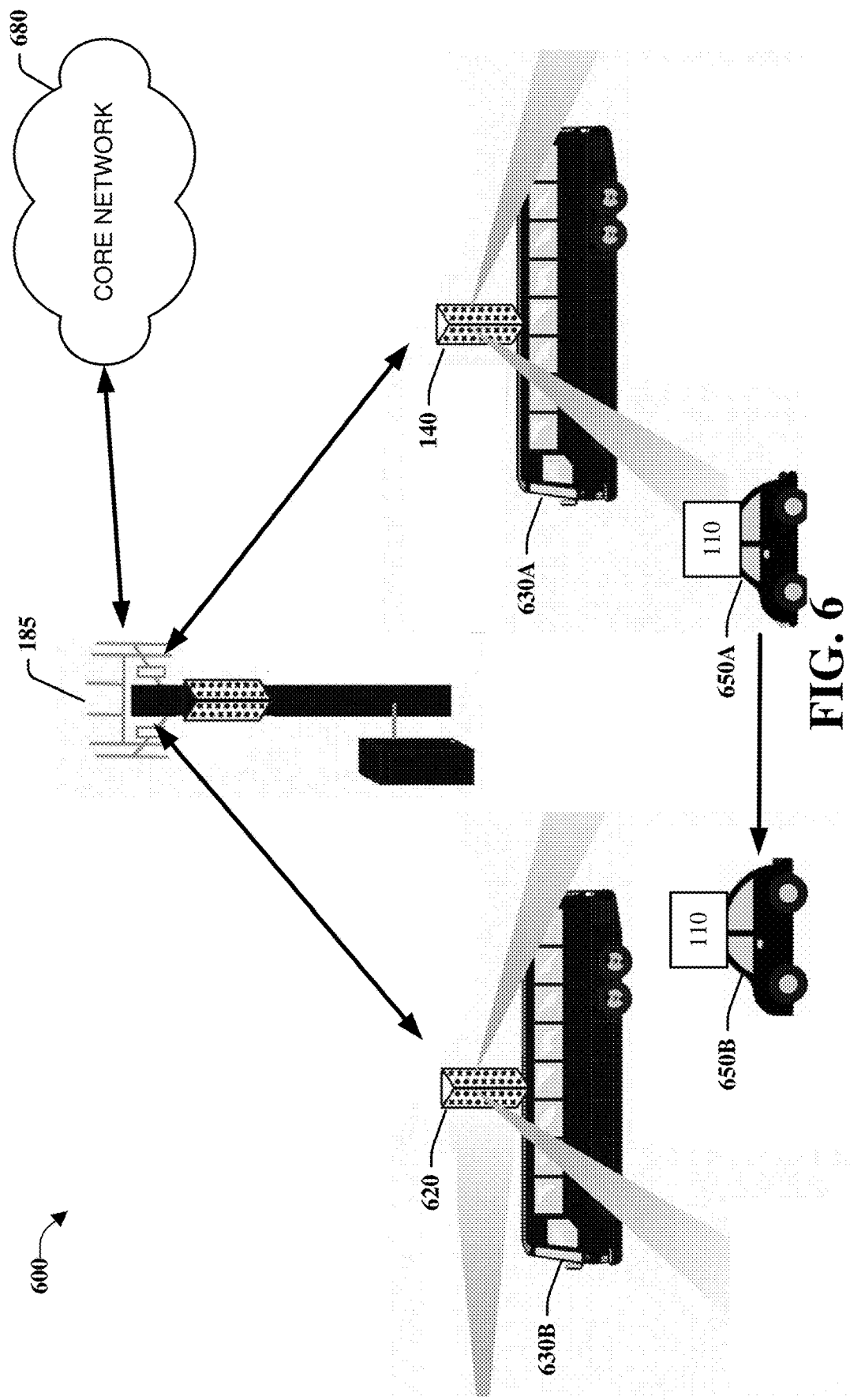
FIG. 6 illustrates an example wireless communication system with a group mobility approach that can adapt to different circumstances, in accordance with one or more embodiments.

It should be understood that multiple UEs 110 connected to network device 140 can be termed a group of UEs 110, and the arrangement discussed herein where UE 110 has a connection to a mobile base station (e.g., network device 140), can be termed group mobility. Figures discussed below discuss different events and procedures that can occur in system 200, including, as shown in FIG. 3, when network device 140 (a mobile base station wirelessly connected to stationary base stations) necessarily switches from being connected to base station 185 to another base station. Conversely, FIG. 6 depicts an event where UE 110 moves away from network device 140 and is switched to being connected to another network device (e.g., a mobile base station).

FIG. 3 illustrates an example wireless communication system 300 and an event where network device 140 switches from base station 185 to base station 385, while UE 110 maintains a connection with network device 140, in accordance with one or more embodiments. For purposes of brevity, description of like elements and/or processes employed in other embodiments is omitted.

As depicted in FIG. 3, bus 330 carrying network device 140, travels 350 from the wireless coverage zone of base station 185 to a new base station 385. Because UE 110 is connected to network device 140, UE 110 necessarily also changes to base station 385 to maintain service. In one approach to this scenario, such a mobility event as depicted in FIG. 3 would result in multiple RRC messages, and procedures would be triggered at both base stations 185 and 385, network device 140, and UE 110.

In addition to wasted resources, it should be noted that, in some circumstances, triggering a UE handover procedure can introduce disruption by factors including reduced throughput and connectivity, and increased latency. Because handover procedures can require RRC procedures, required processes can include: serving cell and neighbor cell measurements, completion of a random access (RACH) procedure to connect to the Anchor cell, and re-establishing of control and data plane bearers, with corresponding RRC configurations. In addition to the additional procedures, causing a handover can increase signaling overhead and processing in the network.

Because a significant majority of the parameters which are reconfigured in a standard handover event are actually associated with the connection by UE 110 to network device 140 (e.g., the Anchor cell), and this connection can be maintained without change during this event, one or more embodiments can use a different approach. In one or more embodiments, network device 140 can use procedures to switch connectivity from base station 185 to base station 385, while maintaining the connection to UE 110. The differences in control messaging and events triggered as compared to the previous approach are described below.

As noted above, one or more embodiments can send two different types of control message to UE 110 for the configuration of wireless connections, with the first type (e.g., Donor RRC message) configuring the centralized network connection, and the second type (e.g., Anchor RRC message) configuring the connection with network device 140. In one or more embodiments, to avoid having UE 110 unnecessarily reconnect to network device 140, the second message is not sent in response to this event, with UE 110 maintaining use the settings included in the second message. In addition, a handover procedure is not triggered at UE 110, because the connection to network device 140 is maintained, e.g., no handover has occurred.

To maintain the control plane through the new base station 385, one or more embodiments can provide an updated version of the first message (Donor RRC message). Example parameters and settings that can be included in both types of messages are discussed with FIG. 5 below. In an alternative embodiment, instead of selectively sending one or both of the first and second messages, both the first and second messages described above both form a single message, including information corresponding to whether UE 110 needs to handover to another base station (e.g., use the settings of the second message). When no handover is indicated, UE 110 can be configured to only use the first portion of the combined control message and not unnecessarily us the second portion of the combined control message.

In yet another embodiment upon establishing a connection between network device 140 and UE 110, the Donor RRC configuration (first message) can be provided first, and subsequently the Anchor RRC configuration (e.g., second message) can be provided as a delta or subset configuration of the Donor RRC configuration.

As noted above, one or more UEs 110 connected to network device 140 can be called a group of devices, and this type of mobility scenario where the Donors (e.g., base station 185) change but the anchor (e.g., network device 140) does not is called "Group Mobility."

In case a mobility event is triggered which changes both the UE 110 connection to network device 140 and the connection of network device 140 to base station 185, both the Donor RRC and the Anchor RRC messaged (or a single, combined message) can be provided to UE 110.

Figure 4:
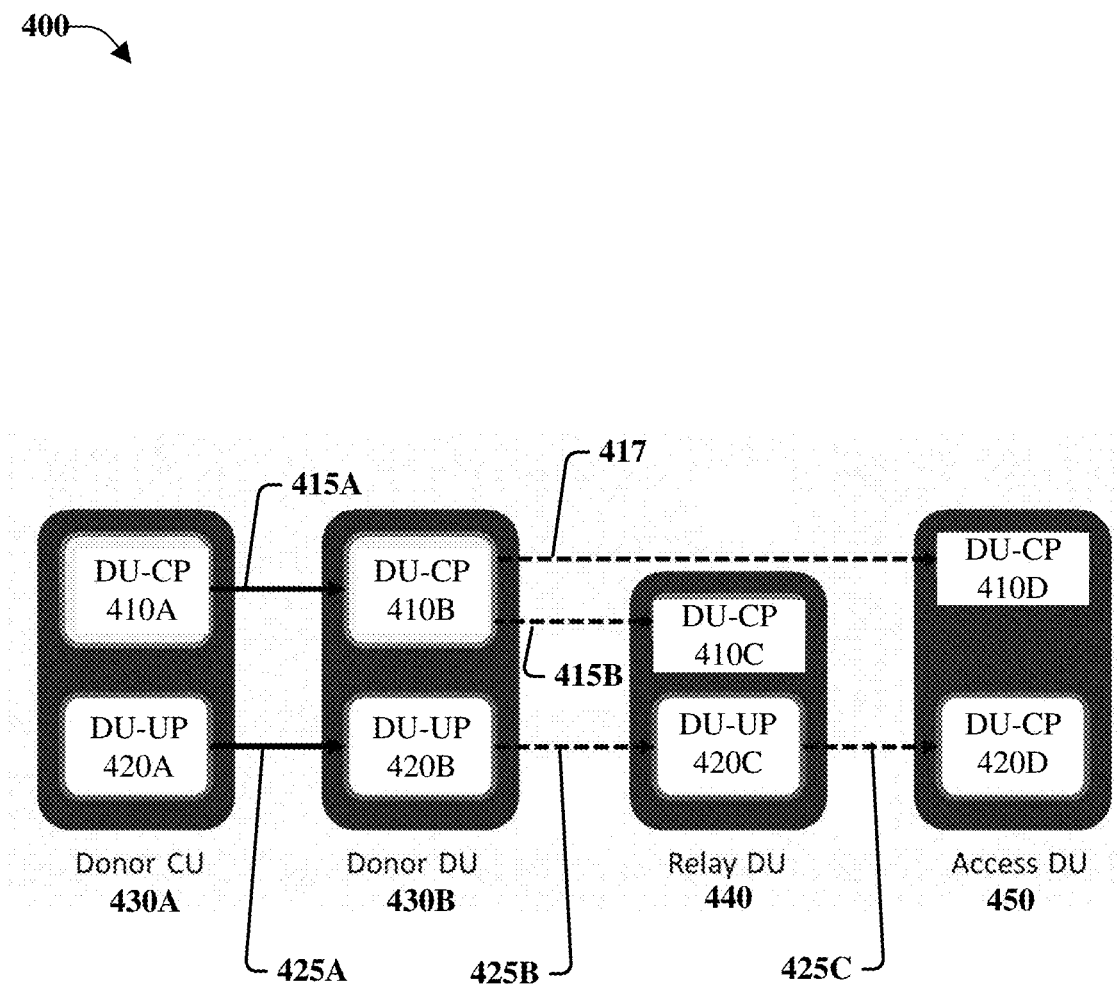
FIG. 4 illustrates an example wireless architecture, nodes are connected by employing separate user and control planes, according to one or more embodiments.

FIG. 4 illustrates an example wireless architecture, nodes are connected by employing separate user and control planes, according to one or more embodiments. For purposes of brevity, description of like elements and/or processes employed in other embodiments is omitted.

As depicted, system 400 shows a separated user plane (U-plane) and control plane (C-plane) with depicted nodes each having a separate distributed unit/control plane (DU-CP) 410A-D and distributed unit/user plane (DU-UP) 420A-D. One benefit that can result in some circumstances from one or more embodiments that separate the control and user plane is that mobility and handover of a given node does not necessarily trigger handover of a child node, e.g., the second approach described above with FIG. 3, where no handover was triggered on the child node (e.g. UE 110).

In addition to being separated, the control and user planes can also use different signaling technology. For example, note that DU-CP 410B is connected 417 directly to DU-CP 410D, while DU-UP 420B uses relay DU 440 to establish the connection. In one or more embodiments, the control plane connection can use sub-6 GHz frequencies that allow longer range connectivity compared to the user plane connections 425B-C, which can use mmWave frequencies. One reason to use the longer range frequencies for control plane connections is reduce the need for handover child nodes.

FIG. 5 depicts an example 500 of the parameters included in example donor RRC message 515, and anchor RRC message 525, in accordance with one or more embodiments. For purposes of brevity, description of like elements and/or processes employed in other embodiments is omitted.

As noted above, donor RRC message 515 (also termed the first message herein) can include parameters associated with centralized control plane functions 510A of the system. Example parameters can include, but are not limited to, Packet Data Convergence Protocol (PDCP) and bearer configurations. Because these are centralized configuration parameters, as described above, UE 110 only needs to receive them upon establishing the connection, and if the anchor node to which UE 110 is connected changes to different nodes.

As is also shown in FIG. 5, anchor RRC message 525 can include information about the connection between UE 110 and the anchor node to which it is connected (e.g., network component 140). For example, parameters 520A-D shown in FIG. 5 are the types of parameters that UE 110 would receive to conventionally switch from base station 185 to base station 385.

FIG. 6 illustrates an example wireless communication system with a group mobility approach that can adapt to different circumstances, in accordance with one or more embodiments. For purposes of brevity, description of like elements and/or processes employed in other embodiments is omitted.

In another alternative embodiment, a "reverse" group mobility event can occur where the UE 110 changes the connection from network device 140 to another mobile base station 620, but the Donor DU/CU (e.g., base station 185) remains the same. To address this event, one or more embodiments can do the opposite of the first example, e.g., provide the second message (e.g., Anchor RRC) to establish the new connection between UE 110 and network device 620 (e.g., a mobile base station mounted on bus 630B). In different embodiments, UE 110 can be either explicitly or implicitly informed that only the Anchor RRC configuration and associated handover procedures (e.g. neighbor cell measurements, RACH, and serving cell parameters) need to be updated.

In a variation of the above circumstance, referring back to the split between the control plane and the user plane discussed with FIG. 4 above, because of the potentially different ranges of control plane signals and user plane signals, the possibility exists that, given a change in location of the Anchor DU, the user plane signal (CU-UP) may be out of range of the Anchor DU, while the control plane signal (CU-CP) may remain in range.

One approach to handling this situation establishes a new connection between the Anchor DU and a Donor DU that can provide the CU-UP signal. For the control messages, in one or more embodiments, the Donor RRC message can be further differentiated into a Donor RRC-CP message and Donor RRC-UP message, corresponding to parameters and procedures associated with the control plane and user plane respectively. In this case, because only the CU-UP was rerouted, only the Donor RRC-UP portion needs to be updated at UE 110.

Figure 7:
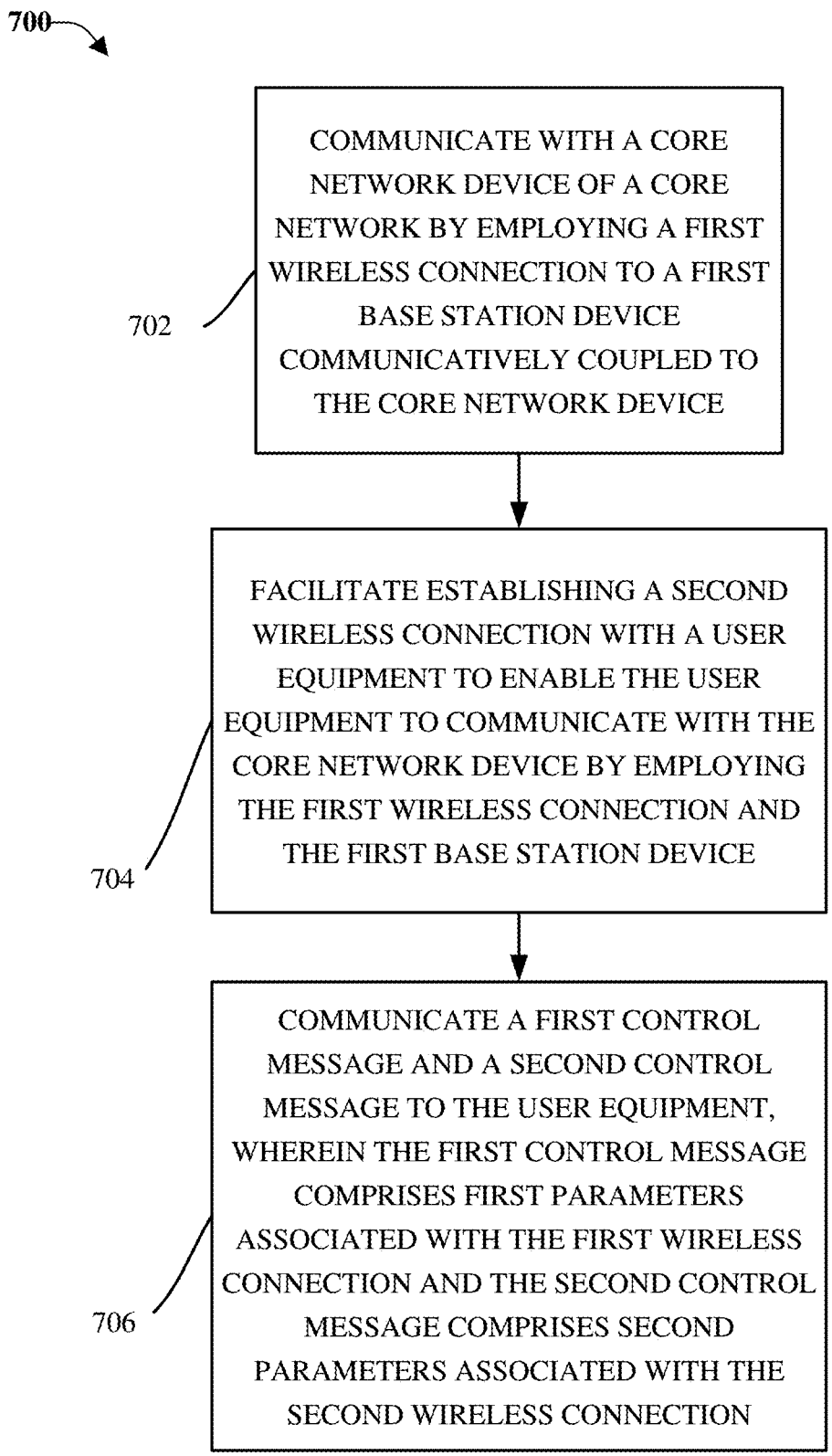
FIG. 7 is a flow diagram representing example operations of system comprising an anchor link component, a control message component, and a backhaul link component, in accordance with one or more embodiments.

FIG. 7 is a flow diagram representing example operations of system that can facilitate a wireless control plane having centralized and distributed control messages, in accordance with one or more embodiments.

At 702, the system can communicate with a core network device of a core network by employing a first wireless connection to a first base station device communicatively coupled to the core network device. At 704, the system can facilitate establishing a second wireless connection with a user equipment to enable the user equipment to communicate with the core network device by employing the first wireless connection and the first base station device.

At 706, the system can communicate a first control message and a second control message to the user equipment, wherein the first control message comprises first parameters associated with the first wireless connection and the second control message comprises second parameters associated with the second wireless connection.

Figure 8:
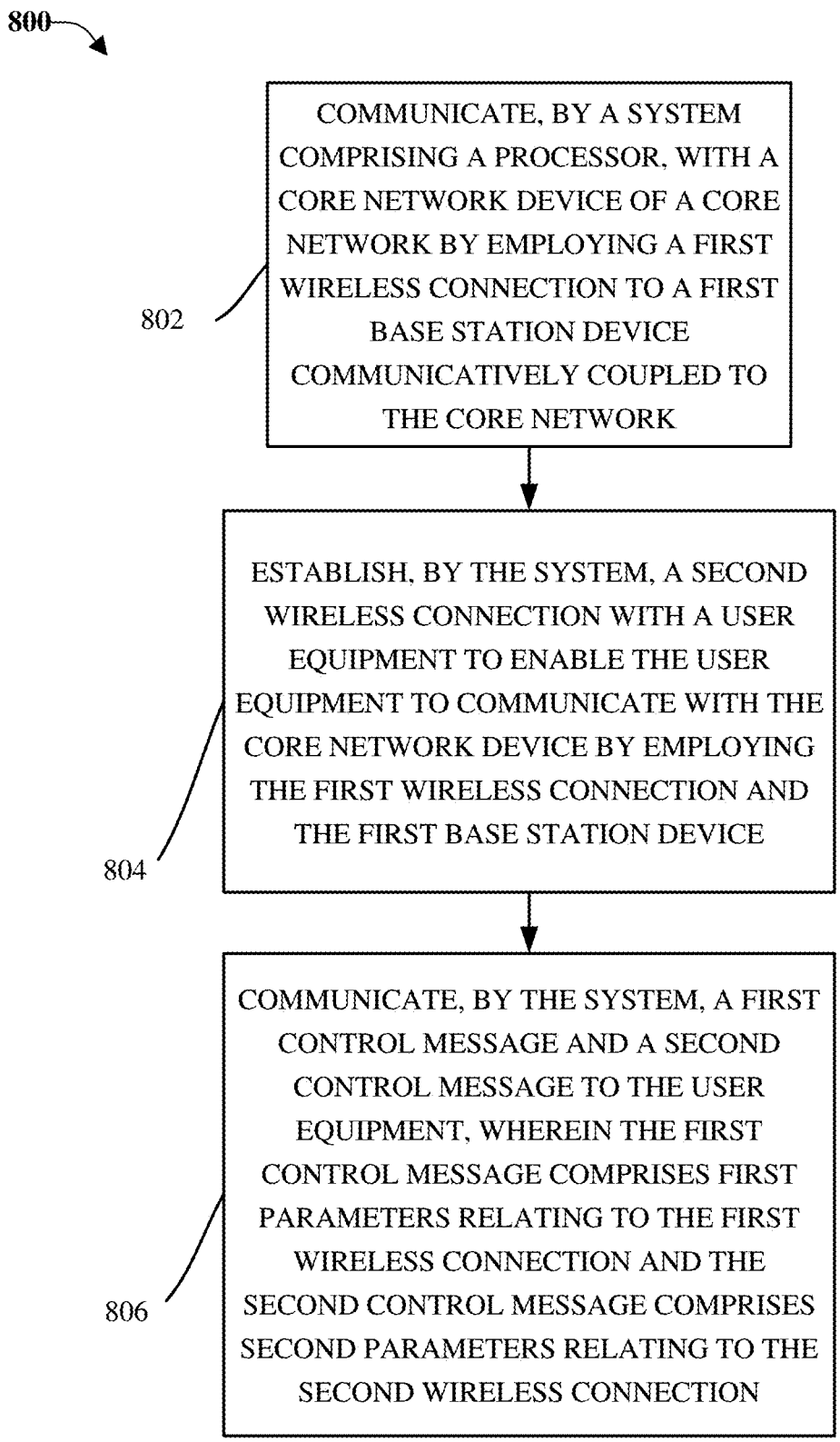
FIG. 8 illustrates a flow diagram of an example method that can facilitate a wireless control plane having centralized and distributed control messages, in accordance with one or more embodiments.

FIG. 8 illustrates a flow diagram of an example method 800 that can facilitate a wireless control plane having centralized and distributed control messages, in accordance with one or more embodiments. For purposes of brevity, description of like elements and/or processes employed in other embodiments is omitted.

At 802, example method 800 can communicate, by a system comprising a processor, with a core network device of a core network by employing a first wireless connection to a first base station device communicatively coupled to the core network. At 804, example method 800 can establish, by the system, a second wireless connection with a user equipment to enable the user equipment to communicate with the core network device by employing the first wireless connection and the first base station device.

At 806, example method 800 can communicate, by the system, a first control message and a second control message to the user equipment, wherein the first control message comprises first parameters relating to the first wireless connection and the second control message comprises second parameters relating to the second wireless connection.

Figure 9:
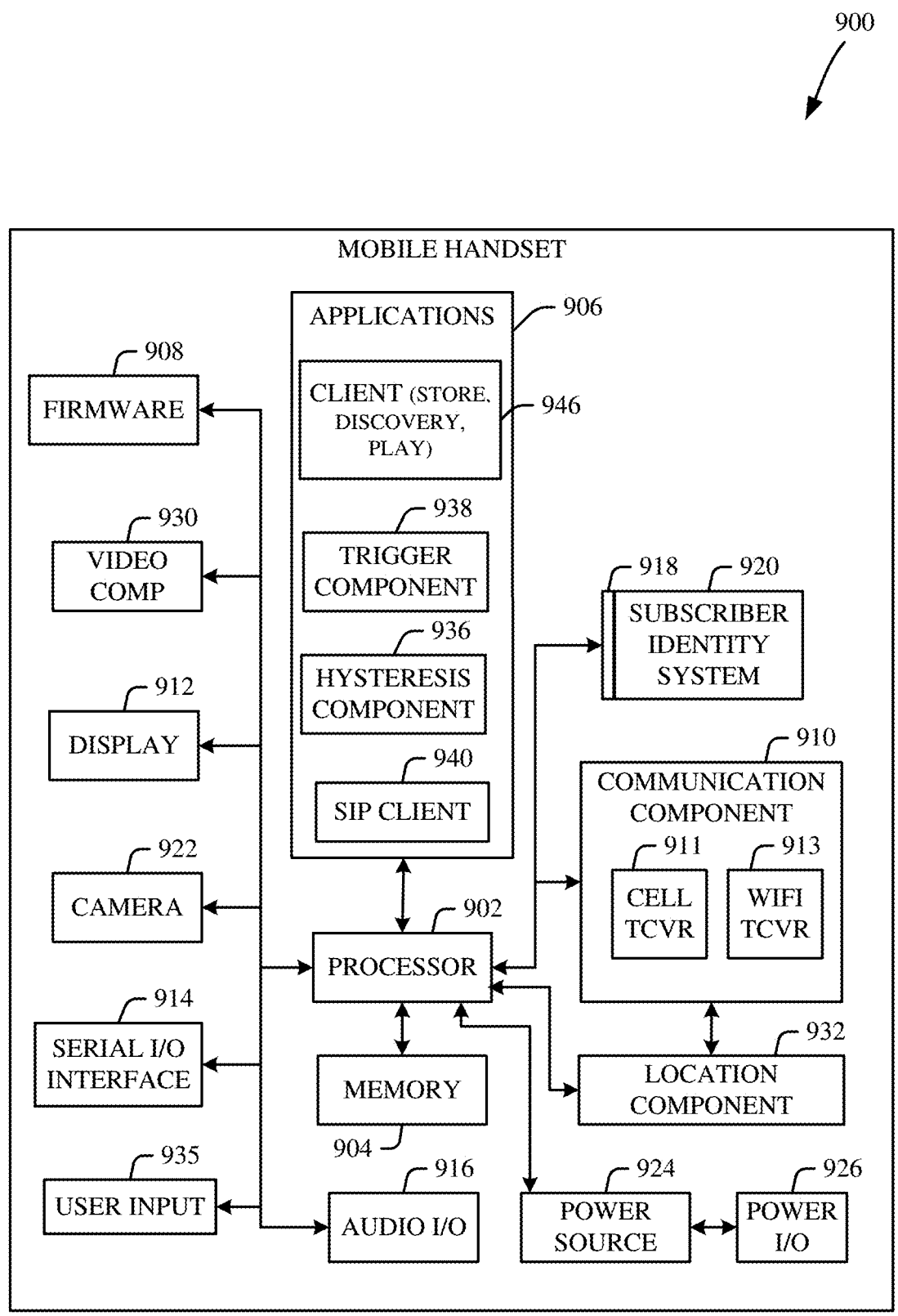
FIG. 9 illustrates an example block diagram of an example mobile handset operable to engage in a system architecture that can facilitate processes described herein, in accordance with one or more embodiments.

Referring now to FIG. 9, illustrated is an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1294) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or a decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

As can be seen, the technology described herein can provide increased robustness and reduced latency of initial access and V2X configuration when control plane and mobility signaling is provided over a sub6-GHz anchor link via multi-connectivity, (compared to a standalone architecture), in which V2X-capable UEs provide initial access, IDLE mode, control plane, and mobility functionality. The technology can facilitate reduced overhead on mmWave backhaul links multiplexing cellular and V2X traffic (of one or more bands) by utilizing sub 6-GHz channels for control plane signaling instead of multiplexing both control and data links on mmWave bands. Still further, the technology described herein provides the ability to efficiently perform local manager configuration and association based on measurements/reports related to sidelink link quality metrics over sub6-GHz channels more efficiently than over the NR mmWave backhaul links. The technology described herein enables support for simultaneous cellular communication with a network infrastructure, in addition to V2X direct communication services on the same or different carriers.

In example implementations, user equipments are able to send and/or receive communication data via a wireless link to the network device. Wireless communication system 200 can thus include one or more communication service provider networks that facilitate providing wireless communication services to various user equipments via the network device and/or various additional network devices (as is understood) included in the one or more communication service provider networks. The one or more communication service provider networks can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks can be or include the wireless communication network and/or various additional devices and components of the wireless communication network (e.g., additional network devices and cell, additional user equipments, network server devices, etc.).

The network device can be connected to one or more communication service provider networks via one or more backhaul links or the like (not shown). For example, the one or more backhaul links can comprise wired link components, such as a T1/E1 phone line, a digital subscriber line (DSL) (e.g., either synchronous or asynchronous), an asymmetric DSL (ADSL), an optical fiber backbone, a coaxial cable, and the like.

The wireless communication system can employ various cellular systems, technologies, and modulation schemes to facilitate wireless radio communications between devices. While example embodiments include use of 5G new radio (NR) systems, one or more embodiments discussed herein can be applicable to any radio access technology (RAT) or multi-RAT system, including where user equipments operate using multiple carriers, e.g. LTE FDD/TDD, GSM/GERAN, CDMA2000, etc. For example, wireless communication system 200 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of systems described herein are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the user equipment. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system 100 can be configured to provide and employ 5G wireless networking features and functionalities. With 5G networks that may use waveforms that split the bandwidth into several sub bands, different types of services can be accommodated in different sub bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Figure 10:
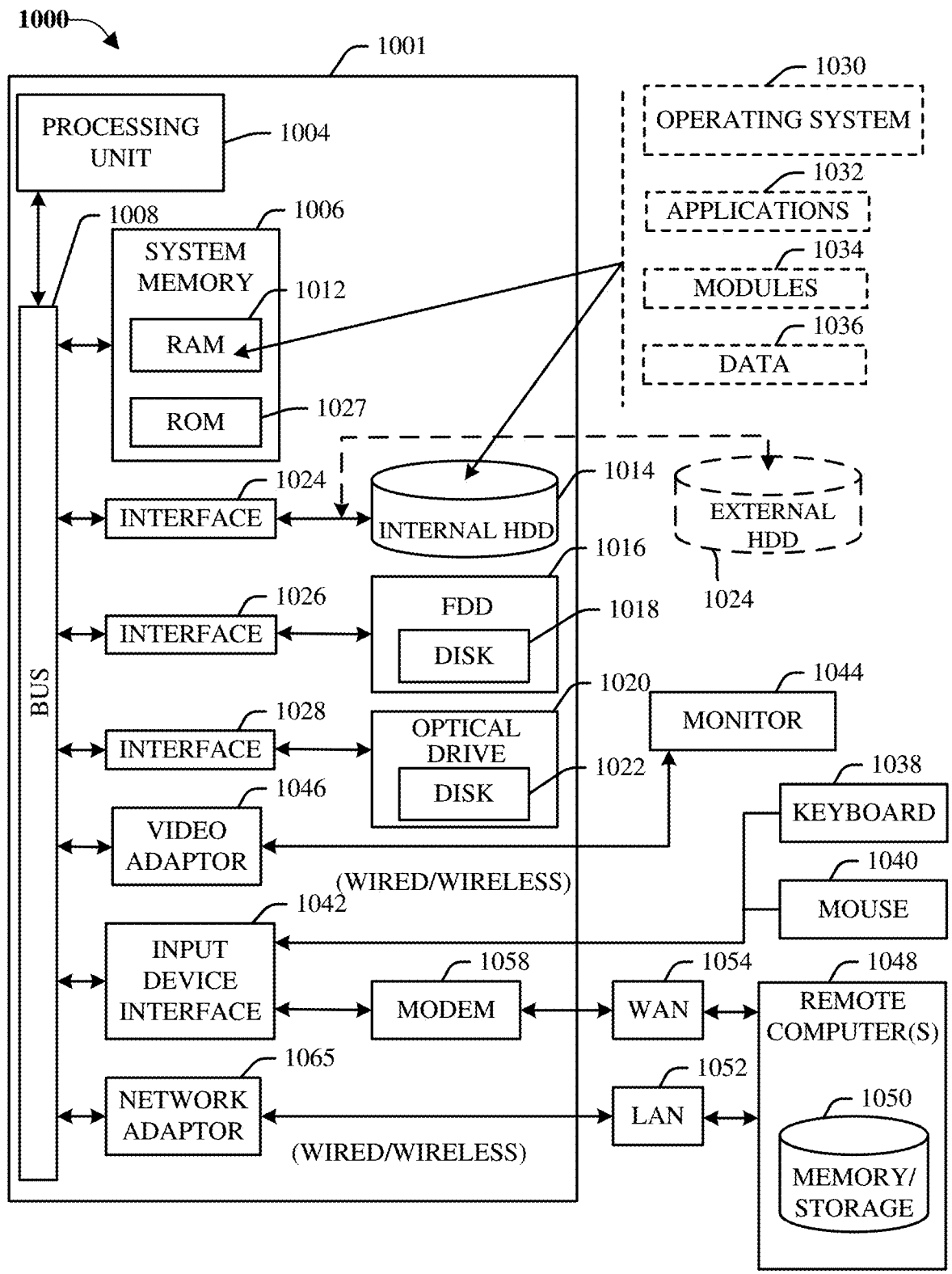
FIG. 10 illustrates an example block diagram of an example computer operable to engage in a system architecture that can facilitate processes described herein, in accordance with one or more embodiments.

Referring now to FIG. 10, illustrated is an example block diagram of an example computer 1000 operable to engage in a system architecture that facilitates wireless communications according to one or more embodiments described herein. The computer 1000 can provide networking and communication capabilities between a wired or wireless communication network and a server (e.g., Microsoft server) and/or communication device. In order to provide additional context for various aspects thereof, FIG. 10 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The techniques described herein can be applied to any device or set of devices (machines) capable of running programs and processes. It can be understood, therefore, that servers including physical and/or virtual machines, personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below with reference to FIG. 10 is but one example of a computing device.

In order to provide a context for the various aspects of the disclosed subject matter, FIG. 10 and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1020 (see below), non-volatile memory 1022 (see below), disk storage 1024 (see below), and memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of an operating environment 1000 operable to execute the disclosed systems and methods in accordance with an embodiment. Computer 1012, which can be, for example, part of the hardware of system 1020, includes a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

System memory 1016 can include volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can include ROM, PROM, EPROM, EEPROM, or flash memory. Volatile memory 1020 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 can also include removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software includes an operating system 1028. Operating system 1028, which can be stored on disk storage 1024, acts to control and allocate resources of computer 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. As an example, a mobile device and/or portable device can include a user interface embodied in a touch sensitive display panel allowing a user to interact with computer 1012. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 include, for example, a serial port, a parallel port, a game port, a universal serial bus (USB), an infrared port, a Bluetooth port, an IP port, or a logical port associated with a wireless service, etc. Output device(s) 1040 and a move use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, cloud service, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipments do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A system, comprising:
a processor; and
a memory that stores executable instructions that, when executed by the processor, facilitate performance of operations, comprising:
communicating with core network equipment by employing a first wireless connection between the system and first base station equipment communicatively coupled to the core network equipment;
establishing a second wireless connection between the system and a user equipment to enable the user equipment to communicate with the core network equipment by employing the first wireless connection and the first base station equipment; and
communicating a first control message and a second control message to the user equipment, wherein the first control message comprises first parameters associated with the first base station equipment and the first wireless connection between the system and the first base station equipment, and wherein the second control message comprises second parameters associated with the second wireless connection between the system and the user equipment.

2. The system of claim 1, wherein the communicating with the core network equipment comprises communicating with the core network equipment by establishing a third wireless connection to second base station equipment, wherein the operations further comprise maintaining the second wireless connection with the user equipment, and communicating an updated first control message to the user equipment, and wherein the updated first control message comprises third parameters associated with the second base station equipment and the third wireless connection.

3. The system of claim 2, wherein the operations further comprise, maintaining the second wireless connection based on the second parameters of the second control message.

4. The system of claim 2, wherein the communicating with the core network equipment comprises communicating with the core network equipment further by performing a first handover procedure to transition from use of the first base station equipment and the first wireless connection to using the second base station equipment and the third wireless connection.

5. The system of claim 4, wherein the operations further comprise maintaining communication with the core network equipment through the first handover procedure, without performing a second handover procedure of the user equipment.

6. The system of claim 4, wherein the system comprises mobile base station equipment, wherein the first base station equipment and the second base station equipment have a respective fixed location, and wherein the first handover procedure is triggered by movement of the mobile base station equipment from a first proximity to the first base station equipment to a second proximity to the second base station equipment.

7. The system if of claim 1, wherein the first control message and the second control message are submessages comprised in a combined control message generated by the first base station equipment.

8. The system of claim 7, wherein the first control message further comprises a third control message and a fourth control message, wherein the third control message comprises control plane parameters describing the first wireless connection, and wherein the fourth control message comprises user plane parameters describing the first wireless connection.

9. A method, comprising:
communicating, by a system comprising a processor, with core network equipment by employing a first wireless connection between the system and first base station equipment communicatively coupled to the core network equipment;
establishing, by the system, a second wireless connection between the system and a user equipment to enable the user equipment to communicate with the core network equipment by employing the first wireless connection and the first base station equipment; and
communicating, by the system, a first control message and a second control message to the user equipment, wherein the first control message comprises first parameters relating to the first base station equipment and the first wireless connection between the system and the first base station equipment, and wherein the second control message comprises second parameters relating to the second wireless connection between the system and the user equipment.

10. The method of claim 9, further comprising:
establishing, by the system, a third wireless connection to second base station equipment communicatively coupled to the core network equipment,
maintaining, by the system, the second wireless connection with the user equipment, and
communicating, by the system, an updated first control message to the user equipment describing the second base station equipment and the third wireless connection.

11. The method of claim 10, further comprising maintaining, by the system, the second wireless connection with the user equipment based on the second parameters of the second control message.

12. The method of claim 10, further comprising performing, by the system, a first handover procedure to transition from use of the first wireless connection to use of the second wireless connection, to communicate with the core network equipment.

13. The method of claim 12, further comprising maintaining, by the system, communication with the core network equipment throughout a duration of the first handover procedure, without performing a second handover procedure.

14. The method of claim 12, wherein the first base station equipment and the second base station equipment have respective fixed locations.

15. The method of claim 9, wherein the first control message and the second control message are submessages comprised in a combined control message generated by the first base station equipment.

16. The method of claim 9, wherein the first control message further comprises a third control message and a fourth control message, wherein the third control message comprises control plane parameters describing the first base station equipment and the first wireless connection, and wherein the fourth control message comprises user plane parameters describing the first wireless connection.

17. A non-transitory machine-readable medium, comprising executable instructions that, when executed by a processor of network equipment, facilitate performance of operations, comprising:

communicating with core network equipment by employing a first wireless connection between the network equipment and first base station equipment communicatively coupled to the core network equipment;

establishing a second wireless connection between the system and a user equipment to enable the user equipment to communicate with the core network equipment by employing the first wireless connection and the first base station equipment; and communicating a first control message and a second control message to the user equipment, wherein the first control message comprises first parameters describing the first base station equipment and the first wireless connection between the network equipment and the first base station equipment, and wherein the second control message comprises second parameters describing the second wireless connection between the network equipment and the user equipment.

18. The non-transitory machine-readable medium of claim 17, wherein the operations further comprise:

establishing a third wireless connection to second base station equipment communicatively coupled to the core network equipment;

maintaining the second wireless connection with the user equipment; and communicating an updated first control message to the user equipment describing the third wireless connection.

19. The non-transitory machine-readable medium of claim 17, wherein the first control message and the second control message are submessages comprised in a combined control message generated by the first base station equipment.

20. The non-transitory machine-readable medium of claim 17, wherein the first control message further comprises a third control message and a fourth control message, wherein the third control message comprises control plane parameters describing the first base station equipment and the first wireless connection, and wherein the fourth control message comprises user plane parameters describing the first wireless connection.

* * * * *